US006322472B1

(12) United States Patent
Schulze-Beckinghausen

(10) Patent No.: US 6,322,472 B1
(45) Date of Patent: Nov. 27, 2001

(54) POSITIONING DEVICE

(75) Inventor: Joerg-Erich Schulze-Beckinghausen, Garbsen (DE)

(73) Assignee: Weatherford/Lamb, Inc., Houston, TX (US)

(*) Notice: Subject to any disclaimer, the term of this patent is extended or adjusted under 35 U.S.C. 154(b) by 0 days.

(21) Appl. No.: 09/242,616

(22) PCT Filed: Aug. 15, 1997

(86) PCT No.: PCT/GB97/02247

§ 371 Date: Feb. 19, 1999

§ 102(e) Date: Feb. 19, 1999

(87) PCT Pub. No.: WO98/07648

PCT Pub. Date: Feb. 26, 1998

(30) Foreign Application Priority Data

Aug. 21, 1996 (DE) .................................................. 9617538

(51) Int. Cl.[7] .................................................. F16H 7/06

(52) U.S. Cl. ............................................ 474/156; 474/155

(58) Field of Search .................................... 474/155–157, 474/154, 67, 85–89, 64–68; 172/162, 122, 203, 85; 81/57.24, 57.35

(56) References Cited

U.S. PATENT DOCUMENTS 2,509,853 5/1950 Wilson .................................. 255/35
2,529,168 * 11/1950 Marshall et al. ................ 474/156 X
2,550,045 12/1951 DeHetre .................................. 81/57
3,379,412 4/1968 Halstead .
3,799,009 3/1974 Guier ................................. 81/57.16
3,848,726 * 11/1974 Wiemer ............................ 474/156 X
3,864,851 * 2/1975 Guntert ........................... 474/156 X
3,883,009 5/1975 Swoboda, Jr. et al. .............. 214/1 B
3,885,679 5/1975 Swoboda et al. ................. 214/1 BD
4,013,178 3/1977 Brown et al. ......................... 214/2.5
4,077,525 3/1978 Callegari et al. ..................... 214/2.5
4,117,941 10/1978 McCleskey, Jr. et al. ............ 214/2.5
4,274,777 6/1981 Scaggs .................................. 414/22
4,629,014 12/1986 Swisher et al. ...................... 175/220
4,735,270 4/1988 Fenyresi .............................. 175/113
4,971,162 11/1990 Back ................................... 175/103
5,102,375 4/1992 Featherstone ........................ 474/155
5,355,643 10/1994 Bringolf ................................ 52/108
5,368,113 11/1994 Schulze-Beck ...................... 175/162
5,667,026 9/1997 Lorenz et al. ....................... 175/162

FOREIGN PATENT DOCUMENTS 2301452 7/1974 (DE) .
0593803 4/1994 (EP) .
2153303 5/1973 (FR) .

OTHER PUBLICATIONS

"Rigid Pushing Chains," Serapid USA, Inc., 1992.

* cited by examiner

*Primary Examiner*—David A. Bucci
*Assistant Examiner*—Marcus Charles
(74) *Attorney, Agent, or Firm*—Moser, Patterson & Sheridan, L.L.P.

(57) ABSTRACT

A positioning device comprising a first flexible member and a second flexible member which can be engaged to form a rigid member, wherein said first flexible member comprises a chain provided with a plurality of compression members, and said second flexible member comprises a locking chain which, when said first flexible member and said second flexible member are brought together inhibits separation of said compression members, characterized in that said compression members are planar.

5 Claims, 7 Drawing Sheets

POSITIONING DEVICE

This invention relates to a positioning device and, more particularly, but not exclusively, to a positioning device for use in the construction, repair and maintenance of oil and gas wells.

Our European Patent Application No. 92 117 969.3 (Publication No. 0 593 803) describes a positioning device which is extremely useful in manoeuvring tongs into position during the construction, repair and maintenance of oil and gas wells. The positioning device has also been found extremely useful in positioning tubulars, particularly lengths of heavy casing during stabbing operations. Essentially the positioning device comprises a first flexible member and a second flexible member which can be engaged to form a rigid member, wherein said first flexible member comprises a chain provided with a plurality of compression members which, in use, can bear against one another, and said second flexible member comprises a locking chain which, when said first flexible member and said second flexible member are brought together inhibits separation of said adjacent compression members.

Whilst this positioning device has been found extremely useful it is relatively expensive to make. It is also believed desirable to be able to increase its lateral strength bearing in mind the use of even larger and heavier tubulars.

U.S. Pat. No. 3,379,412 discloses a device for lifting a vehicle lift platform comprising two separate, flexible link chains both having hooks and pins which interlock as they are forced through merging guides to form a rigid strut.

The present invention aims to reduce the cost of constructing a positioning apparatus for a given duty or increasing the lateral strength for the same cost.

The present invention is characterised in that said compression members are planar.

Preferably, each compression member is provided with two recesses to accommodate sequential cross-members of said locking chain.

Advantageously, one of said recesses is shaped and disposed to snugly accommodate a cross-member of said locking chain whilst the other is shaped and disposed to freely accommodate the next member of said locking chain whilst inhibiting separation of said locking chain from said first member.

Preferably, said compression members are each provided with a leading edge and a trailing edge which, when said first flexible member and said second flexible member are brought together contact one another and tension at least part of said first flexible member.

In one embodiment, said compression members form one side of alternate links of said chain.

In another embodiment said first flexible member comprises two chains which are arranged side-by-side and are connected together, wherein alternate links of each chain comprises an outer plate and an inner plate, and the remaining links comprise an outer plate and an inner plate formed by a compression member.

For a better understanding of the present invention reference will now be made, by way of example, to the accompanying drawings, in which.

Figure 1:
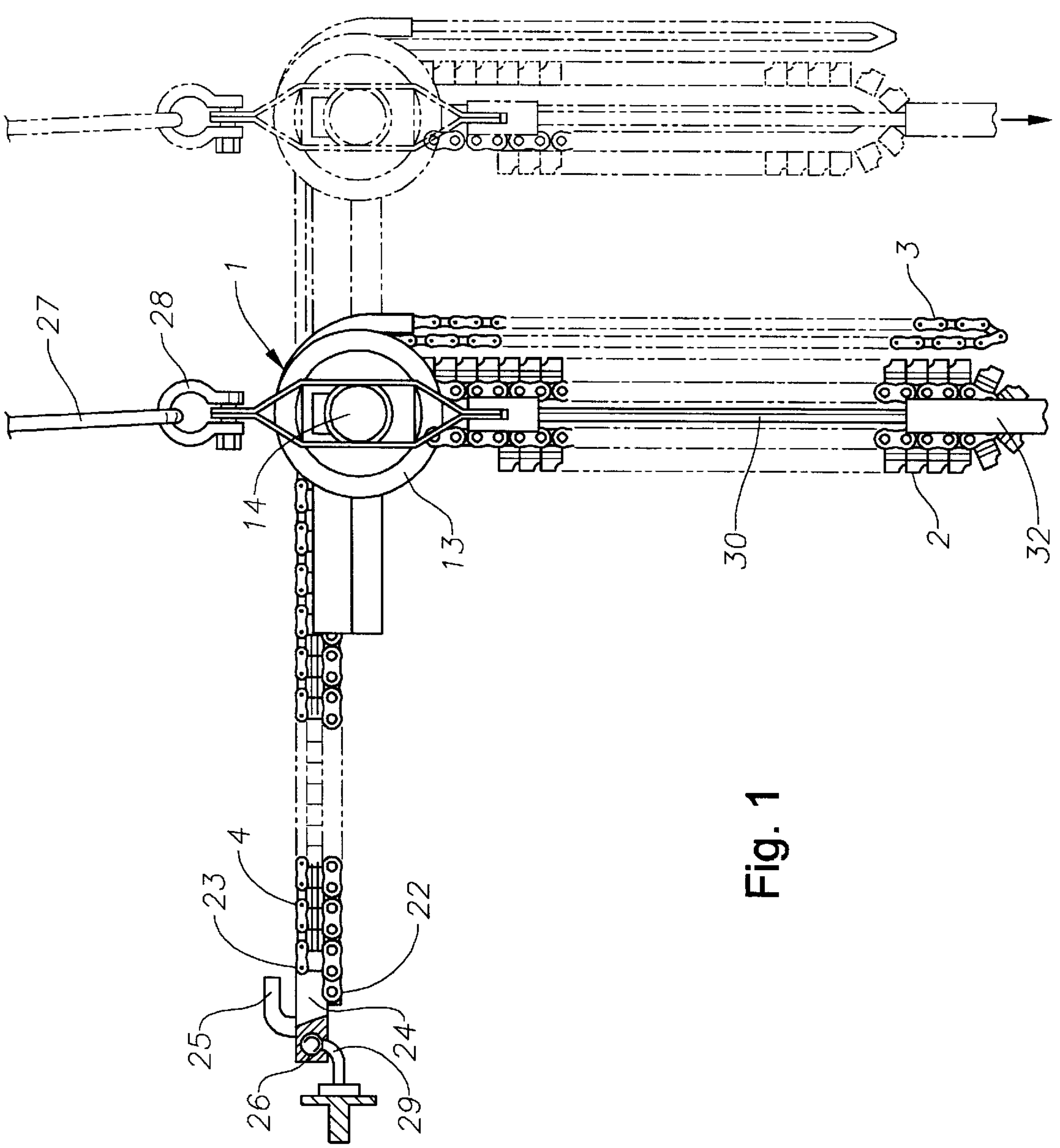
FIG. 1 is a side view of a known positioning device in two different positions, one shown in full lines and the other shown in chain dotted lines.

Referring to FIG. 1 of the drawings, there is shown a known positioning device which is generally identified by reference numeral 1.

The device 1 comprises a first member 2 and a second member 3. The first member 2 and the second member 3 are each flexible but co-operate to form a rigid member 4.

Figure 4:
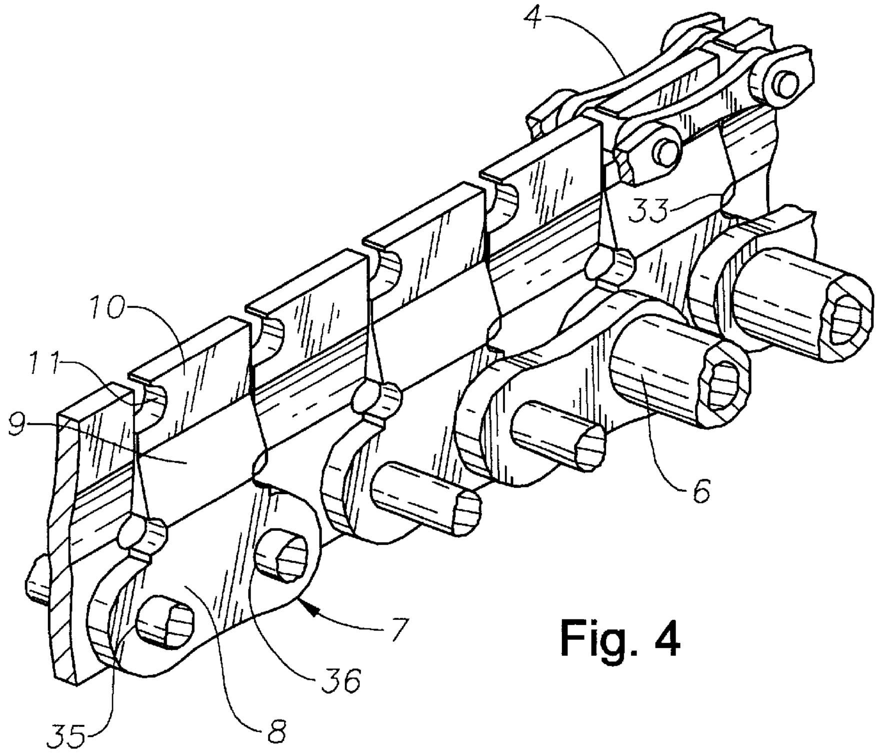
FIG. 4 is a perspective view, with parts cut away, of another part of the device.
Figure 5:
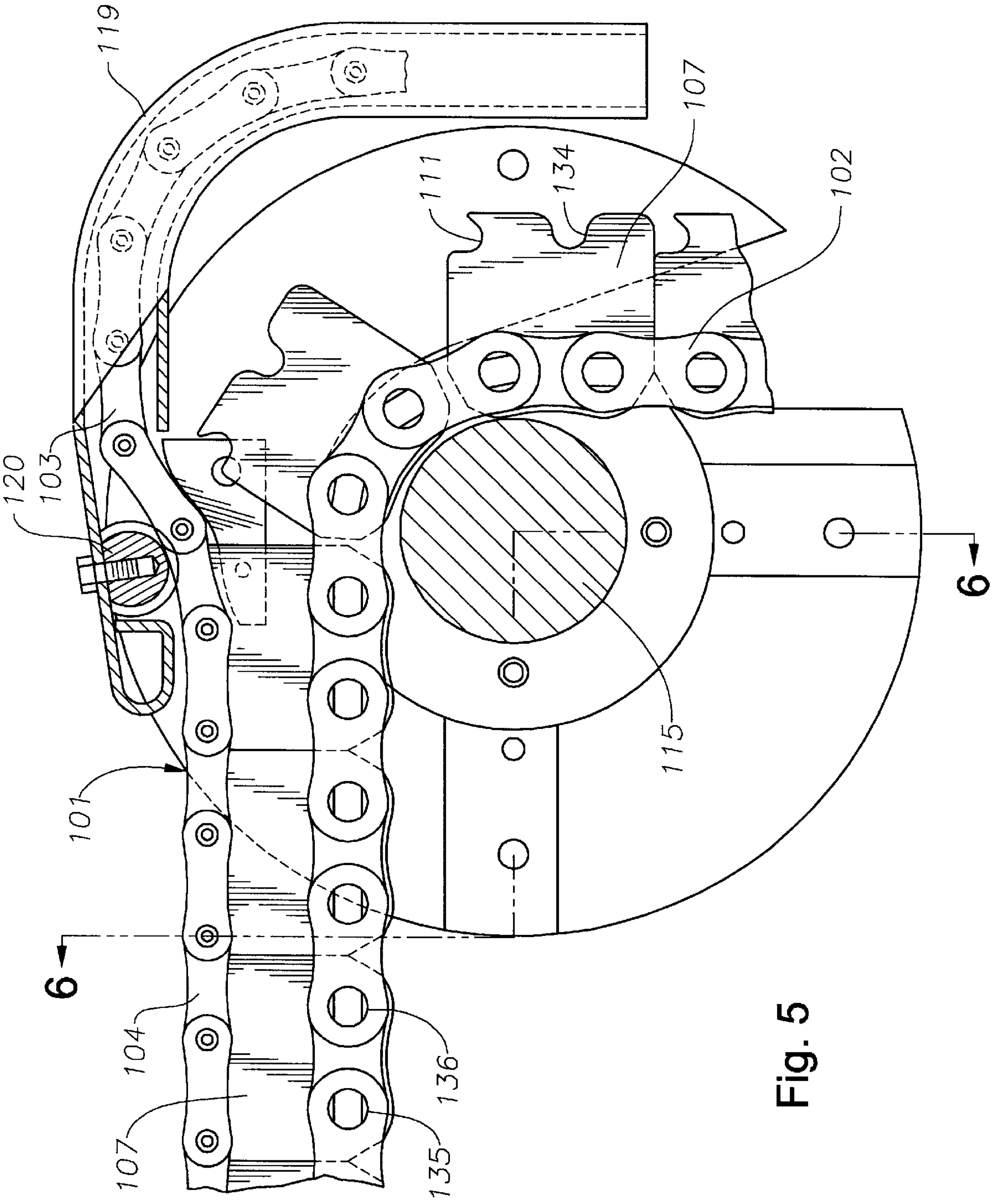
FIG. 5 is a view similar to FIG. 1 but showing one embodiment of a positioning device in accordance with the present invention.
Figure 6:
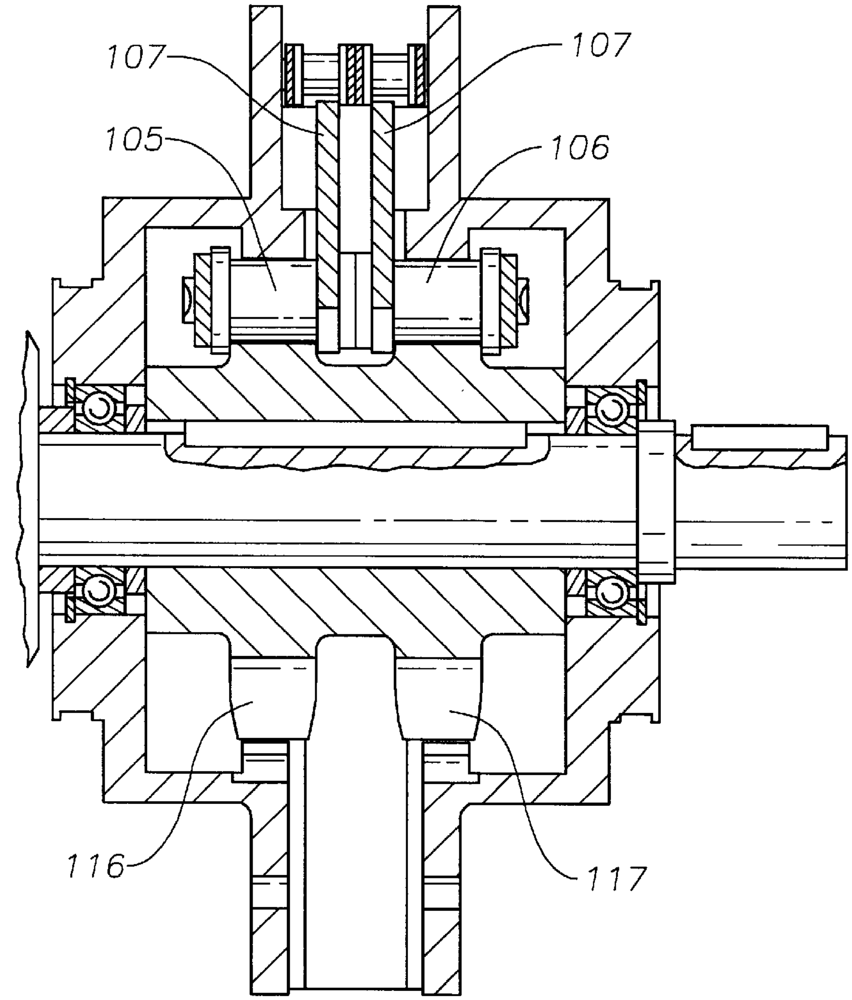
FIG. 6 is a view taken on line VI—VI of FIG. 5 with parts cut away for clarity.

The member 2 comprises two parallel chains 5,6 between which are mounted a succession of compression members 7. As shown in FIG. 4 each compression member 7 comprises a base portion 8, an inclined portion 9 and a blocking portion 10 having a recess 11. A recess 33 is also provided between the bass 8 and the inclined portion 9 to inhibit distortion when the compression members are formed. Each compression member is also provided with two locating holes 35 and 36.

The inclined portions 9 of adjacent compression members 7 are alternately inclined so that the blocking portions 10 lie in a common plane.

The second member 3 comprises a locking chain, one end 12 of which is suspended from a housing 13 on which is mounted a hydraulic motor 14 having a drive sprocket 15 with two rows of teeth 16,17.

Figure 2:
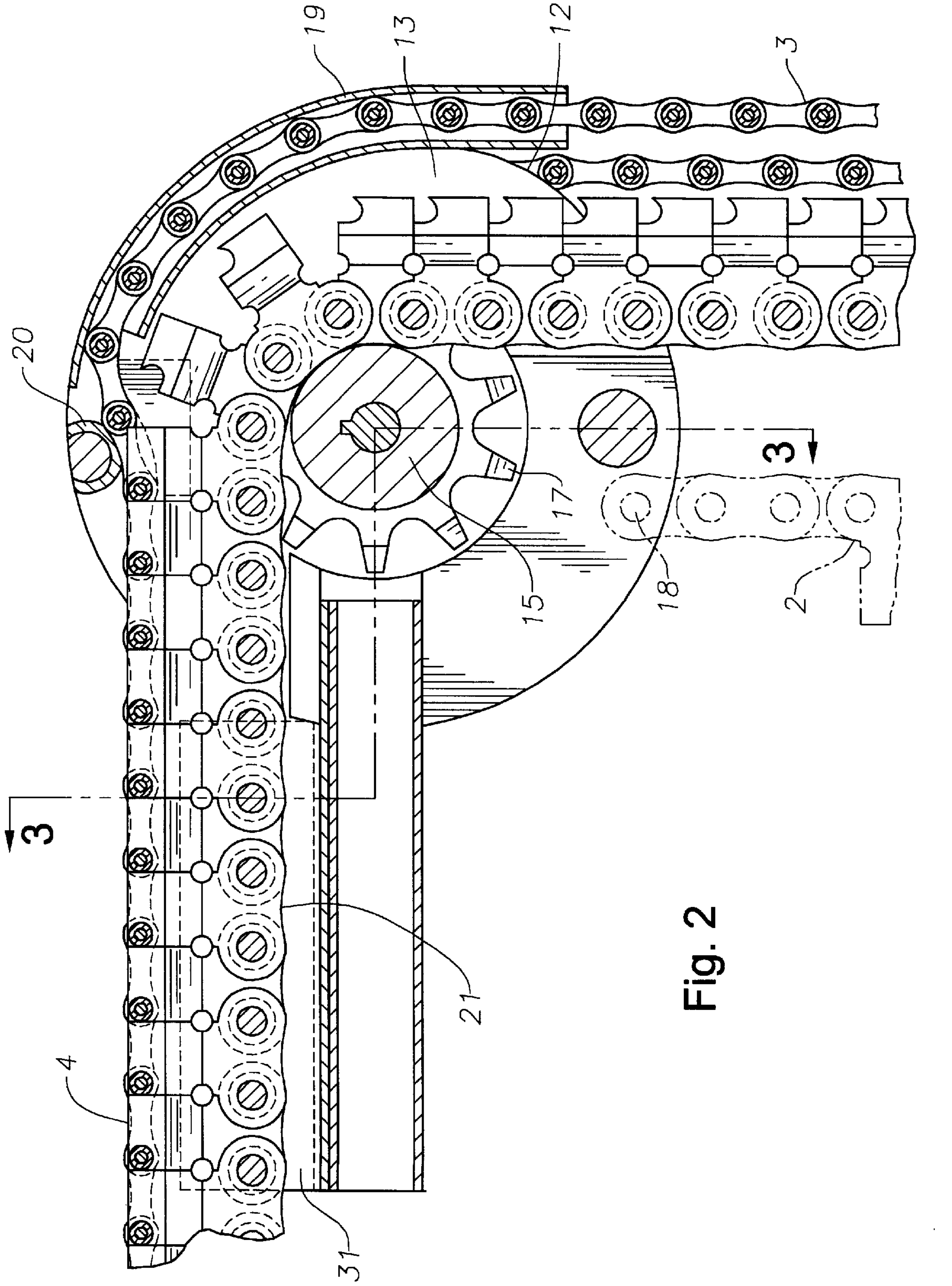
FIG. 2 is a side view, with parts cut away, of part of the device shown in FIG. 1.
Figure 3:
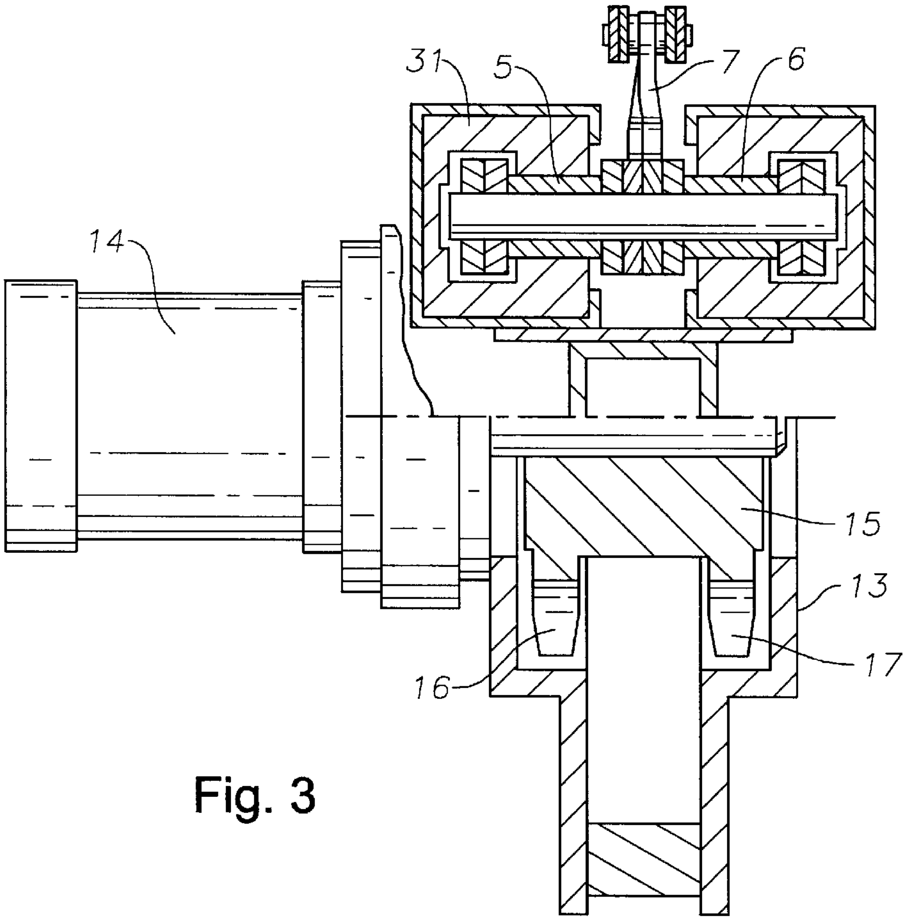
FIG. 3 is a view taken on line III—III of FIG. 2 with parts cut away for clarity.

One end 18 of the first member 2 is also secured to the housing 13 as shown in FIG. 2.

Both the first member 2 and the second member 3 extend downwardly from the housing 13 and then upwardly. The first member 2 passes over the drive sprocket 15 whilst the second member 3 passes through a guide tube 19 which opens adjacent a resilient insertion member 20.

In use, if the hydraulic motor 14 is rotated anti-clockwise as shown in FIG. 2 the upper reach 21 of the first member 2 moves to the left relative to plate 13. At the same times, the pins of the locking chain forming the second member 3 move into the recesses 11. This cooperation forms a rigid member 4. In particular, the locking chain prevents the blocking portions 10 separating to any appreciable extent. Furthermore, the recesses 11 are shaped to inhibit accidental separation of the locking chain.

When the hydraulic motor 14 is rotated clockwise as viewed in FIG. 2 the first member 2 and the second member 3 are separated as they pass between insertion member 20 and the guide tube 19.

The opposite ends 22, 23 of the first member 2 and the second member 3 respectively are attached to a mounting piece 24 having a handle 25 and a socket 26.

In use, the device 1 is first suspended from a point high in a drilling derrick by means of a cable 27 and a shackle 28. The mounting piece 24 is then lifted onto a ball 29 screwed to the drilling derrick. The hydraulic motor 14 is then rotated to produce a rigid member 4 of the required extensions. A tong (not shown) is then suspended from the plate 13 by means of support rod 30 and hydraulic cylinder 32.

When it is desired to move the tong into engagement with a pipe to be rotated the hydraulic motor 14 is rotated anti-clockwise thereby moving the device 1 to the position shown in chain dotted lines in FIG. 1. The height of the tong can be adjusted via hydraulic cylinder 32.

When the tong has completed its tightening/releasing duty the hydraulic motor 14 is rotated clockwise to withdraw the tong to its initial position. If desired, the hydraulic motor 14 can be rotated clockwise until the device 1 is adjacent the mounting piece 24.

The housing 13 is also provided with a guide section 31 for guiding an initial length of the rigid member 4. The guide section 31 supports the rigid member 4 and inhibits it twisting relative to the drive sprocket 15 and damaging the teeth thereof.

The positioning device 1 thus far described has proved very satisfactory in operation. However, it could be improved. In particular, it would be desirable to reduce the manufacturing cost of the positioning device and to increase the lateral rigidity of the rigid member 4.

Turning to the first problem, the compression members 7 are relatively expensive to make. This is because the compression members 7 require the formation of inclined portions 9. This necessitates the provision of recesses 33 prior to bending. Furthermore, it will be noted that the inclined portions 9 of adjacent compression members 7 extend in opposite directions whereas the recesses 11 always face the same direction. Accordingly, two different sets of compression members 7 are required.

Referring to FIGS. 5 to 11 there in shown a positioning device which is generally identified by the reference numeral 101. The positioning device 101 is generally similar to the positioning device shown in FIGS. 1 to 4 and parts having similar functions have been identified by similar reference numerals in the "100" series.

Figure 7:
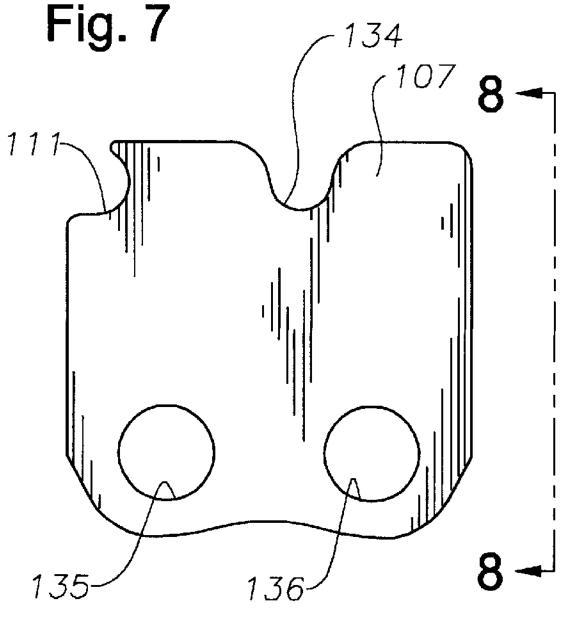
FIG. 7 is a side view of a compression member which forms part of the positioning device of FIG. 5.
Figure 8:
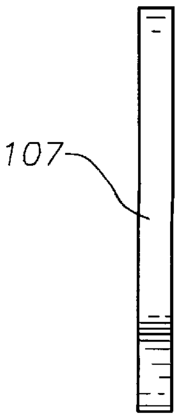
FIG. 8 is an end view of the compression member taken in the direction of the arrows VIII—VIII shown in FIG. 7.

The essential difference lies in the compression members 107. In particular, as shown in FIGS. 7 and 8 each compression member 107 is planar and is provided with a second recess 134.

Figure 9:
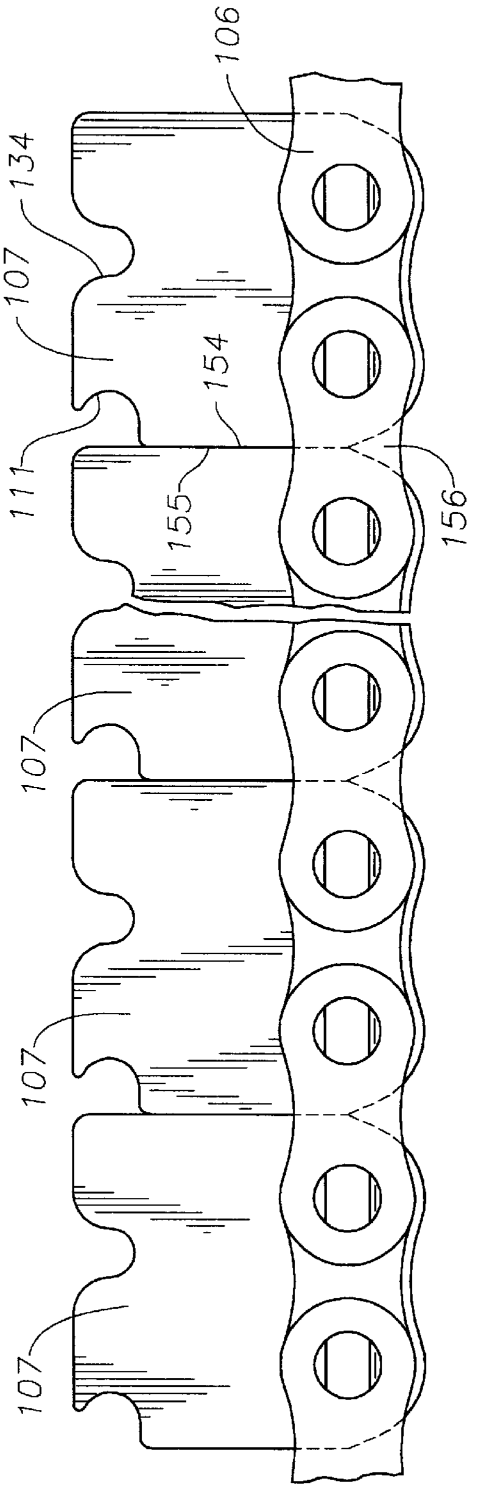
FIG. 9 is a side view of one part of the positioning device of FIG. 5.
Figure 10:
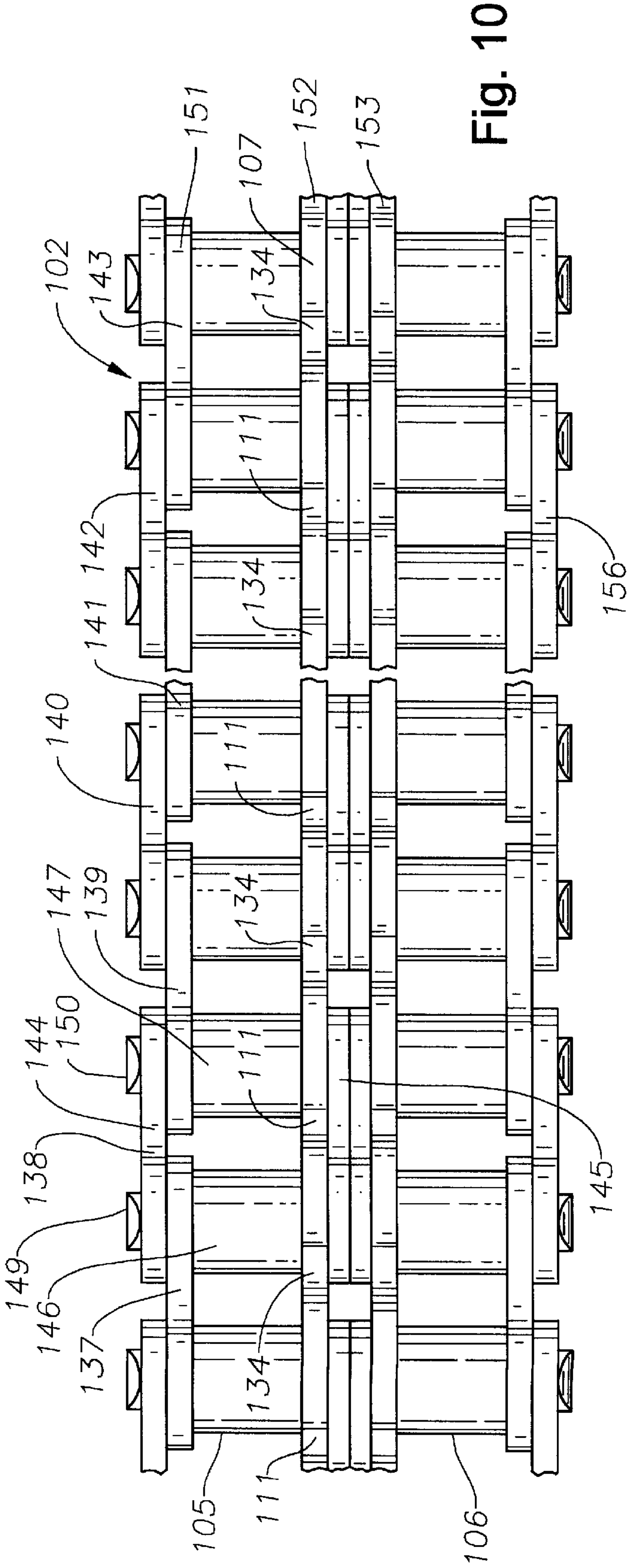
FIG. 10 is a plan view of the part shown in FIG. 9.
Figure 11:
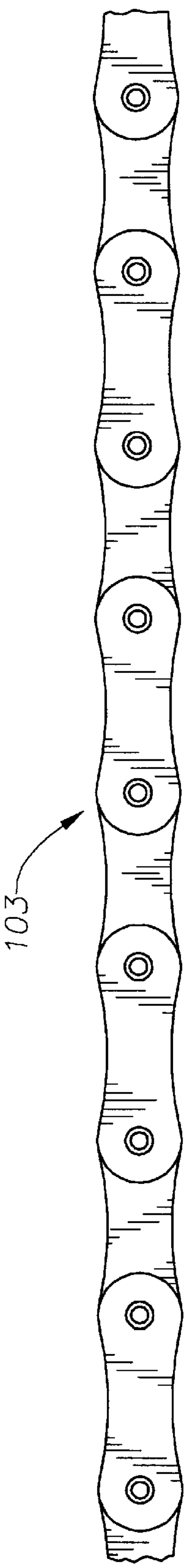
FIG. 11 is a side view of another part of the positioning device of FIG. 5.

As shown in FIGS. 9 and 10, the first member 102 comprises two parallel chains 105 and 106.

The chain 105 in formed by a plurality of links, seven of which 137, 138, 139, 140, 141, 142 and 143 are shown in FIGS. 9 and 10. Each alternate link 138, 140, 142 is of conventional construction comprising an outer plate 144 and an inner plate 145 separated by cylinders 146, 147 and held together with pins 149 and 150. The remaining links, i.e. links 137, 139, 141 and 143 each comprise an outer plate 151 which is identical to outer plate 144. However, the inner plate is formed by a compression member 107.

Chain 106 is formed in a similar manner to chain 105 and, as shown in FIG. 10, the compression members lie in two parallel rows 152 and 153.

As shown in FIG. 9, the compression members 107 are shaped and dimensioned so that the leading edge 154 of one compression member 107 bears firmly against the trailing edge 155 of the adjacent compression member 107 and subjects the associated outer plate 156 to a mild tensile force.

Figure 12:
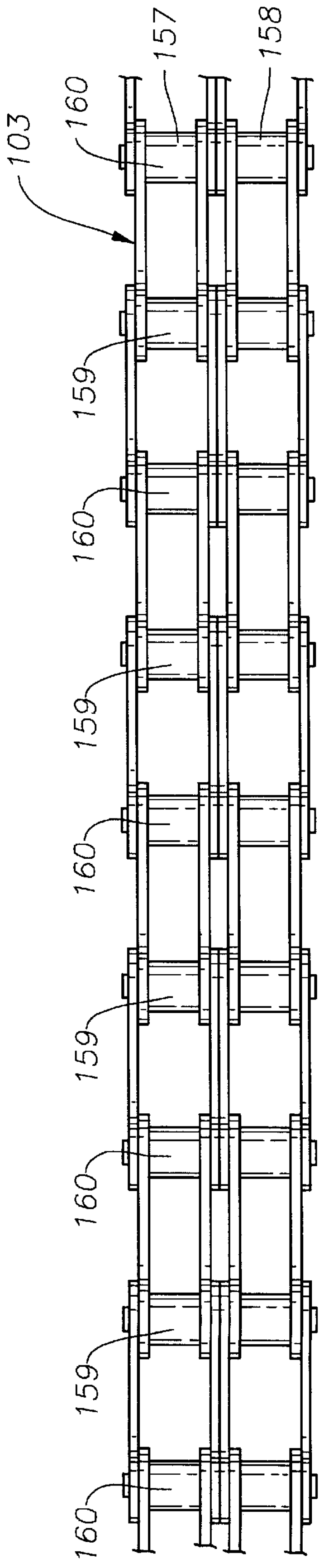
FIG. 12 is a plan view of the another part shown in FIG. 11.

As shown in FIG. 12, the second member 103 comprises two conventional chains 157 and 158 laid side by side and connected together.

The operation of the positioning device 101 is similar to that of the positioning device 1, the only significant difference being that when the first member 102 and second member 103 co-operate to form a rigid member the longitudinal forces are essentially transmitted between alternate rollers 159 of the chains 157 and 158 whilst separation is inhibited by the remaining rollers 160 being hold captive in the recesses 111 which can be formed to have a good clearance with respect to the remaining rollers 160.

Dispensing with the inclined portions 109 greatly facilitates manufacture. Furthermore, replacing the conventional inner plate of alternate links with compression members also simplifies construction although this feature is not essential. In particular, one or more rows of compression members 107 may be place between two conventional chains. Alternatively, both the inner and outer plates could be formed from compression members.

What is claimed is:

1. A positioning device comprising a first flexible member and a second flexible member, wherein said first flexible member comprises a chain provided with a plurality of compression members which bear against one another during operating, and said second flexible member comprises a locking chain which, when said first flexible member and said second flexible member are brought together inhibits separation of said compression members to form a rigid member, characterized in that said compression members are planar, wherein each compression member is provided with two recesses to accommodate sequential crossmembers of said locking chain, and wherein one of said recesses is shaped and disposed to snugly accommodate a crossmember of said locking chain whilst the other is shaped and disposed to freely accommodate another crossmember of said locking chain whilst inhibiting separation of said locking chain from said first member.

2. A positioning device as claimed in claim 1, wherein said compression members are each provided with a leading edge and a trailing edge which, when said first flexible member and said second flexible member are brought together, contact one another and tension at least part of said first flexible member.

3. A positioning device as claimed in claim 1 wherein said compression members form one side of alternate links of said chain.

4. A positioning device as claimed in claim 1 wherein said first flexible member comprises two chains which are arranged side-by-side and are connected together, wherein alternate links of each chain comprise an outer plate and an inner plate, and the remaining links comprise an outer plate and an inner plate formed by a compression member.

5. A positioning device comprising a first flexible member and a second flexible member, wherein said first flexible member comprises a chain provided with a plurality of compression members which bear against one another during operating, and said second flexible member comprises a locking chain which, when said first flexible member and said second flexible member are brought together inhibits separation of said compression members to form a rigid member, characterized in that said compression members are planar, the first and second flexible members each comprising two parallel chains, with said compression members being mounted between the chains of the first member to form two parallel rows of compression members, the members of each row engaging links of a corresponding one of the chains of the second flexible member when the first and second flexible members are brought together.

* * * * *